United States Patent
Kanamori et al.

(10) Patent No.: US 11,086,062 B2
(45) Date of Patent: Aug. 10, 2021

(54) CIRCUMFERENTIALLY LIGHT-EMITTING TYPE THERMOPLASTIC RESIN MOLDED BODY

(71) Applicants: FUKUVI CHEMICAL INDUSTRY CO., LTD., Fukui (JP); KURARAY CO., LTD., Kurashiki (JP)

(72) Inventors: Naoaki Kanamori, Fukui (JP); Toshiaki Sugawara, Tsukuba (JP); Hiroshi Oshima, Tsukuba (JP); Dai Kataoka, Tokyo (JP)

(73) Assignees: FUKUVI CHEMICAL INDUSTRY CO., LTD., Fukui (JP); KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/494,669

(22) PCT Filed: Mar. 16, 2018

(86) PCT No.: PCT/JP2018/010622
§ 371 (c)(1),
(2) Date: Sep. 16, 2019

(87) PCT Pub. No.: WO2018/180644
PCT Pub. Date: Apr. 10, 2018

(65) Prior Publication Data
US 2020/0018884 A1     Jan. 16, 2020

(30) Foreign Application Priority Data
Mar. 31, 2017   (WO) .................. PCT/JP2017/013681

(51) Int. Cl.
*F21V 8/00*     (2006.01)
*G02B 6/02*     (2006.01)
*G02B 6/036*    (2006.01)

(52) U.S. Cl.
CPC ......... *G02B 6/001* (2013.01); *G02B 6/02033* (2013.01); *G02B 6/036* (2013.01)

(58) Field of Classification Search
CPC .............. G02B 6/02033; G02B 6/1221; G02B 2006/12069; G02B 2006/12071; G02B 2006/12073; G02B 2006/12076
See application file for complete search history.

(56) References Cited

U.S. PATENT DOCUMENTS 5,857,761 A * 1/1999 Abe ........................ G02B 6/001
                                                    362/268
6,123,442 A * 9/2000 Freier ..................... G02B 6/001
                                                    362/559
(Continued)

FOREIGN PATENT DOCUMENTS

JP    2000-131530 A    5/2000
JP    2009-276651 A    11/2009
(Continued)

OTHER PUBLICATIONS

Apr. 10, 2018 International Search Report issued in International Patent Application No. PCT/JP2018/010622.
(Continued)

*Primary Examiner* — Ryan A Lepisto
*Assistant Examiner* — Erin D Chiem
(74) *Attorney, Agent, or Firm* — Oliff PLC

(57) ABSTRACT

A circumferentially light-emitting thermoplastic resin molded body which can be bent for use according to the type of optical ornaments or the shape of an object to be decorated and which allows the overall luminance of the emitted light to improve and restrains the luminescent color from being yellowed at the distal locations of such body with regard to the light source. The thermoplastic resin molded body has a core layer made from a thermoplastic elastomer; and a first clad layer made from a thermoplastic resin whose (Continued)

refractive index is smaller than the thermoplastic elastomer from which the core layer is made, in which a light diffusing agent is added to the thermoplastic elastomer from which the core layer is made and the thermoplastic resin from which the first clad layer is made respectively; and the total light transmittance of the first clad layer is defined as less than 70%.

6 Claims, 6 Drawing Sheets

(56) References Cited

U.S. PATENT DOCUMENTS

| | | | | |
|---|---|---|---|---|
| 6,236,460 | B1* | 5/2001 | Johnson | B29C 41/003 356/436 |
| 6,366,727 | B1* | 4/2002 | Nojiri | G02B 6/001 362/551 |
| 6,519,401 | B1* | 2/2003 | Imamura | G02B 6/001 385/123 |
| 2003/0214804 | A1* | 11/2003 | Irie | G02B 6/4215 362/23.16 |
| 2008/0205840 | A1* | 8/2008 | Wakabayashi | G02B 6/08 385/128 |
| 2008/0248071 | A1* | 10/2008 | Doat | A61K 8/60 424/401 |
| 2009/0143560 | A1* | 6/2009 | Hatanaka | G02B 27/4211 528/196 |
| 2011/0063872 | A1* | 3/2011 | Irie | B60Q 3/64 362/565 |
| 2011/0148661 | A1 | 6/2011 | Shikii et al. | |
| 2012/0177329 | A1* | 7/2012 | Sakabe | G02B 6/02033 385/100 |
| 2014/0341518 | A1* | 11/2014 | Kimura | G02B 6/02033 385/102 |
| 2018/0231711 | A1* | 8/2018 | Kanamori | G02B 6/02033 |

FOREIGN PATENT DOCUMENTS

| | | |
|---|---|---|
| JP | 2012-103617 A | 5/2012 |
| JP | 2013-057924 A | 3/2013 |
| JP | 2013/058334 A | 3/2013 |
| JP | 2013057924 A * | 3/2013 |
| WO | 2010/001589 A1 | 1/2010 |
| WO | 2016/190138 A1 | 12/2016 |

OTHER PUBLICATIONS

Apr. 10, 2018 Written Opinion issued in International Patent Application No. PCT/JP2018/010622.

* cited by examiner

CIRCUMFERENTIALLY LIGHT-EMITTING TYPE THERMOPLASTIC RESIN MOLDED BODY

TECHNICAL FIELD

The present invention relates to improvement on a circumferentially light-emitting type thermoplastic resin molded body, in detail, pertaining to such molded body as being readily and flexibly bent for use according to the shape of an object to be decorated or according to a linearly formed decorative letter and/or pattern; being excellent in light emitting performance; and restraining the luminescent color from being yellowed at the locations of such molded body distant away from the light source.

PRIOR ART

In recent years, a linear light emitting element has been used for a number of optical ornaments such as ornamental fittings or illuminations and decorative signs, in which the neon lamps having been used in the form of a linear light emitting element since before are essentially made of a glass tube poor at flexibility, so that there is no bending the same along the curved portion of a wall or drawing a decorative letter or pattern with the same.

Thus, conventionally, such a light guiding rod has been developed as being made from plastic; light being emitted from its circumferential surface; and serving as a linear light emitting element with light made incident at the edge face thereof (refer to the disclosures of Documents 1 to 3 below), but adopting a transparent resin higher in flexural modulus of elasticity for the material of the core layer problematically leads to making such rod so rigid that it cannot be bent to a great extent for practical use.

As a countermeasure, the present applicant has developed a flexible light guiding rod and applied for patent in which an acryl based thermoplastic elastomer is adopted for the material of the core layer, but there is much to be desired on the light emitting performance thereof and it necessitates a means to suppress the yellowing of the luminescent color (the phenomenon in which the luminescent color becomes tinted with yellow. i.e. it turns yellower at the farther locations from the light source).

On the other hand, conventionally, in order to restrain the light emitted from the light guiding rod from being yellowed, such a technique has been known as a small amount of bluing agent being added to the resin materials from which the core layer and the clad layer are made so as to make the light emitted from such rod somewhat bluish, but such a technique as controlling chromaticity shift of the luminescent color from the proximal to distal locations of such rod with regard to the light source to the minimum has not been known.

CITATION

Patent Literature

Document 1: Japanese Patent Unexamined Application Publication No. 2000-131530
Document 2: Japanese Patent Unexamined Application Publication No. 2009-276651
Document 3: Japanese Patent Unexamined Application Publication No. 2013-57924

DISCLOSURE OF THE INVENTION

Technical Problem

In view of the foregoing prior issues, the present invention is to provide a circumferentially light-emitting type thermoplastic resin molded body which can be flexibly bent for use according to the type of optical ornaments or the shape of an object to be decorated and which allows the overall luminance of the emitted light to improve and restrains the luminescent color from being yellowed at the distal locations of such body with regard to the light source.

Solution to Problem

The means adopted herein to solve the above issues is explained with reference to the accompanying drawings.

Specifically, in the preamble reciting a thermoplastic resin molded body comprising at least a core layer 1 made from a thermoplastic elastomer; and a first clad layer 2 made from a thermoplastic resin whose refractive index is smaller than that of the thermoplastic elastomer from which the core layer is made, the present invention is characterized in that a light diffusing agent is added to the thermoplastic elastomer from which the core layer 1 is made and the thermoplastic resin from which the first clad layer 2 is made respectively; and the total light transmittance of the first clad layer 2 is defined as less than 70%.

Further, according to the present invention, in order to enhance the light emitting performance, it is preferred that the proportional ratio by weight of the light diffusing agent added to the thermoplastic elastomer from which the core layer 1 is made range from 0.5 ppm to 10 ppm.

Moreover, in order to restrain the luminescent color from being yellowed, it is preferred that the proportional ratio by weight of a bluing agent added to the thermoplastic elastomer from which the core layer 1 is made range from 0.1 ppm to 10 ppm. The 'bluing agent' referred to herein denotes a blue or purple coloring agent to absorb visible light over the yellow wavelength range.

In addition, according to the present invention, in order to enhance the light emitting performance, it is preferred that the thickness of the first clad layer 2 range from 0.1 to 0.3 mm while the proportional ratio by weight of the light diffusing agent added to the thermoplastic resin from which the first clad layer 2 is made range from 0.05 to 1.5%.

Further, in order to make the thermoplastic resin molded body excellent in light emitting performance and shockproof property, it is preferred that an acryl based thermoplastic elastomer be adopted for the material of the core layer 1 and a fluorine based resin be adopted for the material of the first clad layer 2.

In addition, according to the present invention, in order to make the thermoplastic resin molded body excellent in light emitting performance, it is preferred that titanium oxide or barium sulfate be adopted for the light diffusing agent which is added to the core layer 1 and the first clad layer 2.

Furthermore, for the same purpose as above, it is preferred that a second clad layer 3 which is made from the same resin material as that of the first clad layer 2 and to which the light diffusing agent is not added be formed between the core layer 1 and the first clad layer 2.

On top of the above, when the above second clad layer 3 is formed, due to the same reason as above, it is preferred that the proportional ratio of the thickness of the second clad layer 3 to that of the first clad layer 2 range from 50% to 150%; the total thickness of the first and second clad layers 2 and 3 range from 0.15 mm to 0.4 mm; and the proportional ratio by weight of the light diffusing agent added to the resin material from which the first clad layer 2 is made range from 0.05 to 1.5%.

Advantageous Effects

According to the present invention disclosing a thermoplastic resin molded body from the circumferential surface of which light is emitted, by adopting an acryl based thermoplastic elastomer for the material of the core layer, it allows a flexible light guiding rod to be formed, which enables such rod to be fixed to an object to be decorated with the same bent to a large extent and such rod to be formed into a decorative letter or pattern. This leads to enlarging the scope of applications of such light guiding rod which have been unavailable before.

As to the thermoplastic resin molded body according to the present invention, such arrangement that the light diffusing agent is added to the respective resin materials of the core layer and the clad layer allows the luminance of the light guiding rod as a whole to largely improve as well as the chromaticity shift (transition from white to yellow) of the luminescent color experienced from the proximal section of the light source to the distal section thereof to be restrained to the minimum so as to suppress the luminescent color from being yellowed.

Accordingly, with the thermoplastic resin molded body of the present invention, it not only leads to solving the flexibility problem with the prior light guiding rod from the circumferential surface of which light is emitted, but also opts for decorative and display applications because its light emitting performance and color unevenness are improved through the favorable action of the light diffusing agent added to the core and clad layers, so that its industrial applicability is considered very high.

EMBODIMENTS

First Embodiment

Figure 1:
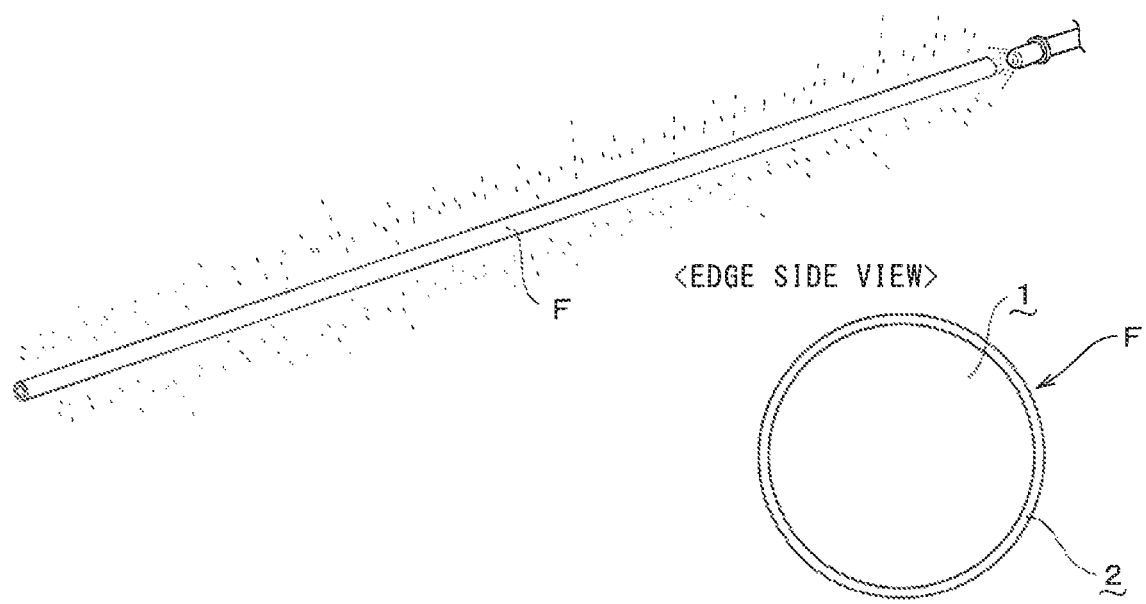
FIG. 1 is a perspective view showing the thermoplastic resin molded body as a whole according to the first embodiment of the present invention.
Figure 2:
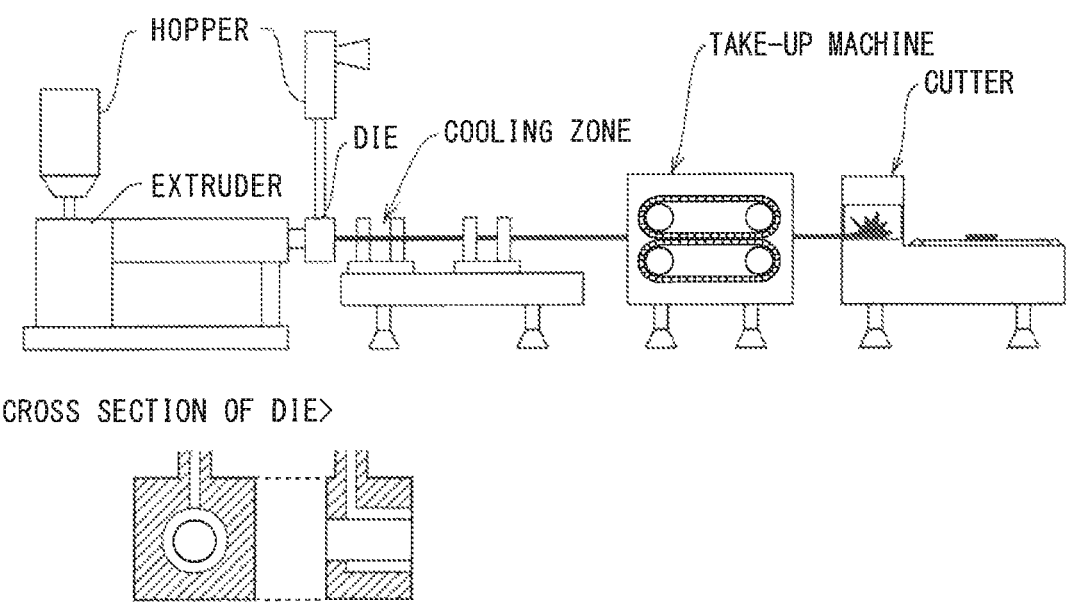
FIG. 2 is an explanatory view showing the steps of producing the thermoplastic resin molded body according to the first embodiment of the present invention.

The first embodiment hereof is explained with reference to FIGS. 1 and 2, in which a thermoplastic resin molded body from the circumferential surface of which light is emitted, a core layer and a first clad layer are denoted as reference signs F, 1 and 2 respectively.
(Constitution of Thermoplastic Resin Molded Body and Method of Use)
[1] Basic Constitution of Thermoplastic Resin Molded Body According to the present embodiment, as illustrated in FIG. 1, the thermoplastic resin molded body F of a flexible light guiding rod type is constituted by forming the first clad layer 2 made from a thermoplastic resin whose refractive index is smaller than that of the thermoplastic elastomer from which the core layer 1 is made around the periphery of the core layer 1. Further, it is arranged herein such that the predetermined amount of a light diffusing agent is added to the respective resin materials from which the core and clad layers 1 and 2 are made while the addition of the light diffusing agent to the first clad layer 2 is carried out such that the total light transmittance of the first clad layer 2 is less than 70%.
[2]Method of Use of Thermoplastic Resin Molded Body As to the above thermoplastic resin molded body F, as illustrated in FIG. 1, it is used in such a manner that light is emitted from the circumferential surface of such molded body F with a light source disposed at one end or both ends thereof and light made incident on the edge side thereof. Since the predetermined amount of the light diffusing agent is added to the core and clad layers 1 and 2 respectively of the thermoplastic resin molded body F, it allows such body to emit light in the state where unevenness in light emission and the yellowing of luminescent color are suppressed better than the counterpart to which such agent is not added.
[3]On Core Layer Then, the respective components of the above thermoplastic resin molded body F are explained as follows. To begin with, an acryl based thermoplastic elastomer is adopted for the material of the core layer 1. Specifically speaking, it is preferred that an acryl based block copolymer, in which a polymer block (a1) mainly consisting of a methacrylic acid ester unit is bonded to each extreme end of a polymer block (a2) essentially consisting of an acrylic acid ester unit or which has at least the structure (a1)-(a2)-(a1), in which the hyphen denotes a chemical bond, be adopted for the acryl based thermoplastic elastomer. The molecular weights and compositions of the polymer blocks (a1) at both ends of the polymer block (a2) may be the same or different between them. Further, the acryl based block copolymer may include a diblock copolymer expressed with (a1)-(a2).

To note, methyl methacrylate and the like are exemplified herein for methacrylic acid ester from which the methacrylic acid ester unit is derived, in which such unit may comprise one type of or two or more types of those methacrylic acid esters.

Further, methyl acrylate, n-butyl acrylate, benzyl acrylate and the like are exemplified herein for acrylic acid ester from which the acrylic acid ester unit is derived, in which such unit may comprise one type of or two or more types of those acrylic acid esters and it is preferred that such unit comprise n-butyl acrylate, benzyl acrylate or n-butyl acrylate and benzyl acrylate. In case where such unit comprises the copolymer of n-butyl acrylate and benzyl acrylate, it is preferred that the proportional ratio by mass of n-butyl acrylate to benzyl acrylate be from 50/50 to 90/10, in which it is more preferable that such ratio range from 60/40 to 80/20.

Then, it is preferred that a block copolymer of methyl methacrylate and butyl acrylate (hereinafter, referred to as MMA-BA block copolymer), the flexural modulus of elasticity according to ASTM D790 of which ranges from 50 to 500 MPa, be adopted for the material of the core layer. In this regard, taken co-extrusion molding with the first clad layer 2 during production into account, it is preferred that a resin whose MFR (Melt Flow Rate) under the test conditions of the temperature of 190° C. and the load of 5 kg ranges from 2 to 10 g/10 min be adopted for the material of the core layer 1.

[4]On First Clad Layer

It is preferred that a fluorine based resin whose refractive index is smaller than that of the core layer 1 be adopted for the material of the first clad layer 2, in which ETFE (copolymer of ethylene and tetrafluoroethylene) and EFEP (terpolymer of hexafluoropropylene, tetrafluoroethylene and ethylene) are in use for the present embodiment. However, other fluorine based resins such as PVDF (polyvinylidene difluoride) and the other resins are also adoptable for the same. In this regard, taken co-extrusion molding with the core layer 1 during production into account, it is preferred that a resin whose melting point is at 230° C. or lower be adopted for the material of the first clad layer 2.

When PVDF is adopted for the material of the first clad layer 2, it has higher compatibility with the acryl based thermoplastic elastomer from which the core layer 1 is made, so that there is a merit in that the clad layer 2 becomes hard to be peeled from the core layer 1 during use. On the other hand, when ETFE is adopted for the material of the first clad layer, the elongation rate of ETFE (i.e. 350 to 450%) is larger than that of PVDF (i.e. 200 to 300%) while the flexural modulus of elasticity of ETFE (i.e. 800 to 1000 MPa) is smaller than that of PVDF (i.e. 1400 to 1800 MPa), so that wrinkles are hard to occur on the clad layer when the thermoplastic resin molded body F is bent. Further, ETFE is higher in visible light transmittance than PVDF, so that the attenuation rate of luminance can be minimized. To note, the respective numerical values of the above elongation rates are those measured according to ASTM D638 while the respective numerical values of the above flexural moduli of elasticity are those measured according to ASTM D790.

[5]On Light Diffusing Agent

In the present embodiment, titanium oxide in powdery form is adopted for the light diffusing agent to be added to the core layer 1 and the first clad layer 2, but barium sulfate may be adopted for the same instead. As to the amount by which the light diffusing agent is added to the core layer 1, it is preferred that the proportional ratio by weight of the light diffusing agent to the resin material from which the core layer 1 is made range from 0.5 ppm to 10 ppm. In turn, when the thickness of the first clad layer 2 is defined as ranging from 0.1 mm to 0.3 mm (preferably ranging from 0.2 mm to 0.3 mm), it is preferred that the proportional ratio by weight of the light diffusing agent to the resin material from which the first clad layer 2 is made range from 0.05 to 1.5%.

[6]On Bluing Agent

In the present embodiment, by adding a bluing agent (blue or purple pigment) to the core layer 1, it restrains the luminescent color of the thermoplastic resin molded body F from being yellowed. As to the amount by which the bluing agent is added to the core layer, it is preferred that the proportional ratio by weight of the bluing agent to the resin material from which the core layer 1 is made range from 0.1 ppm to 10 ppm.

[7]On Shape of Thermoplastic Resin Molded Body

In the present embodiment, the thermoplastic resin molded body F is round bar-shaped in cross section, but may be angular or intricately bar-shaped in cross section. Further, it may take a plate-like shape whose aspect ratio is cross-sectionally large.

(Method of Producing Thermoplastic Resin Molded Body)

Then, the method of producing a thermoplastic resin molded body F is explained as follows. As illustrated in FIG. 2, after the core layer and the clad layer are simultaneously extruded from a die of an extruder and the integrated core and clad layers are subjected to cooling and shaping, the resulting thermoplastic resin molded body is cut into a prescribed length. Upon production, it is preferred that an acryl based thermoplastic elastomer whose MFR under the test conditions of the temperature of 190° C. and under the load of 5 kg ranges from 2 to 10 g/10 min be adopted for the material of the core layer while a fluorine based resin whose melting point is 230° C. or lower be adopted for the material of the clad layer; and such layers be subjected to co-extrusion molding under the molding temperature of 270° C. or lower.

Second Embodiment (Constitution of Thermoplastic Resin Molded Body)

[1]On Basic Constitution of Light Guiding Rod

Figure 3:
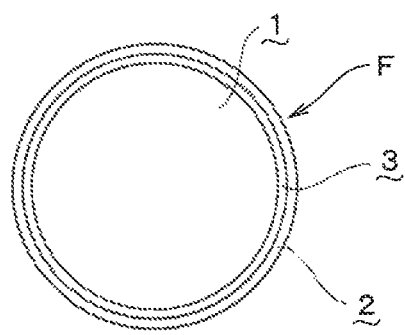
FIG. 3 is an enlarged edge side view of the thermoplastic resin molded body according to the second embodiment of the present invention.

Now, the present embodiment is explained with reference to FIG. 3. What is denoted with numeral reference 3 in the drawing is a second clad layer. In the present embodiment, a thermoplastic resin molded body F of a flexible light guiding rod type is constituted with the second clad layer 3 interposed between the core layer 1 and the first clad layer 2. The light diffusing agent is added to the respective resin materials from which the core layer 1 and the outer first clad layer 2 are made. The same resin material as the first clad layer 2 is adopted for the material of the second clad layer 3, but the light diffusing agent is not added to the resin material from which the second clad layer is made. This arrangement allows the uniform light emitting performance of the thermoplastic resin molded body F to improve.

The conditions imposed upon selecting the resin material from which the core layer 1 is made and those imposed upon selecting the resin material (the same resin material as the second clad layer 3) from which the first clad layer 2 is made are the same as the first embodiment. Further, the material of the light diffusing agent, an amount by which such diffusing agent is added to the resin materials from which the core layer 1 and the first clad layer 2 are made and the conditions imposed upon production are also the same as the first embodiment.

[2]Thickness of Clad Layer and Amount by which Light Diffusing Agent is Added

On the other hand, as to the thickness of the clad layer, it is preferred that the proportional ratio of the second clad layer 3 in thickness to the first clad layer 2 range from 50% to 150% and the total thickness of the first and second clad layers 2 and 3 range from 0.15 mm to 0.4 mm. Then, it is preferred that the light diffusing agent be added to the resin material from which the first clad layer 2 formed in relation to the above total thickness is made such that the proportional ratio of the light diffusing agent by weight to the resin material from which the first clad layer 2 is made ranges from 0.05 to 1.5%. In the present embodiment as well, it is preferred that the light diffusing agent be added to the first clad layer 2 such that the total light transmittance of those two layers of the first and second clad layers 2 and 3 is below 70%.

EXAMPLES (Verification Test (i) on Effect)

Now, the verification test (i) on advantageous effects brought by the present invention is explained. In the first place, a plurality of samples (the following comparison examples 1 to 3 as well as the following examples 1 to 5) which are different from one another in production conditions (i.e. addition of the light diffusing agent and bluing agent to the core layer, an amount by which the light diffusing agent is added and constitution of the clad layer) are prepared and evaluation on light emitting performance (luminance of emitted light and attenuation rate) and chromaticity shift of the luminescent color is made on the respective samples. To note, in the present verification test, a powdery titanium oxide is adopted for the light diffusing agent. The production conditions of the comparison examples 1 to 3 and those of the first to fifth examples are as follows.

Comparison Example 1

In this example, a round bar-shaped thermoplastic resin molded body comprises a core layer and a first clad layer whose thickness is 0.24 mm. The thermoplastic resin molded body is produced through co-extrusion molding by adopting an MMA-BA block copolymer whose MFR under the test conditions of the temperature of 190° C. and the load of 2.16 kg is 3.1 g/10 min and whose flexural modulus of elasticity is 400 MPa for the material of the core layer while by adopting an ETFE whose melting point, elongation rate, flexural modulus of elasticity and MFR under the test conditions of the temperature of 297° C. and the load of 5 kg are 192° C., 417%, 959 MPa and 78.6 g/10 min respectively for the material of the first clad layer. The light diffusing agent is not added to the core layer, but only to the first clad layer such that the proportional ratio of the light diffusing agent by weight to the resin material from which the first clad layer is made is 0.065%. It is found that the total light transmittance of the first clad layer is 65.2%.

Comparison Example 2

In this example, a round bar-shaped thermoplastic resin molded body comprises a core layer, a second clad layer whose thickness is 0.1 mm and a first clad layer whose thickness is 0.11 mm. The thermoplastic resin molded body is produced through co-extrusion molding by adopting the same MMA-BA block copolymer as the comparison example 1 for the material of the core layer while by adopting the same ETFE as the first clad layer according to the comparison example 1 for the material of the second and first clad layers respectively. The light diffusing agent is not added to the core layer, but only to the first clad layer such that the proportional ratio of the light diffusing agent by weight to the resin material from which the first clad layer is made is 1.3%. It is found that the total light transmittance of those two layers of first and second clad layers is 24.5%.

Comparison Example 3

This example is the same as the comparison example 2 except that blue and purple pigments which are bluing agents are added to the resin material from which the core layer is made such that the proportional ratio of the respective pigments by weight to the resin material from which the core layer is made is 1 ppm and an antioxidant is added to the resin material from which the core layer is made such that the proportional ratio of the antioxidant by weight to the resin material from which the core layer is made is 0.1%. The total light transmittance of those two layers of first and second clad layers turns out to be 24.5%.

First Example

In this example, a round bar-shaped thermoplastic resin molded body comprises a core layer and a first clad layer whose thickness is 0.24 mm. The thermoplastic resin molded body is produced through co-extrusion molding by adopting an MMA-BA block copolymer whose MFR under the test conditions of the temperature of 190° C. and the load of 2.16 kg is 3.1 g/10 min and whose flexural modulus of elasticity is 400 MPa for the material of the core layer while by adopting an ETFE whose melting point, elongation rate, flexural modulus of elasticity and MFR under the test conditions of the temperature of 297° C. and the load of 5 kg are 192° C., 417%, 959 MPa and 78.6 g/10 min respectively for the material of the first clad layer.

The light diffusing agent is added to the core layer such that the proportional ratio of the light diffusing agent by weight to the resin material from which the core layer is made is 1 ppm. On the other hand, the light diffusing agent is added to the first clad layer such that the proportional ratio of the light diffusing agent by weight to the resin material from which the first clad layer is made is 0.065%. Blue and purple pigments which are bluing agents are added to the core layer such that the proportional ratio of the respective pigments by weight to the resin material from which the core layer is made is 1 ppm while an antioxidant is added to the core layer such that the proportional ratio of the antioxidant by weight to the resin material from which the core layer is made is 0.1%. The total light transmittance of the first clad layer turns out to be 65.2%.

Second Example

In this example, a round bar-shaped thermoplastic resin molded body comprises a core layer, a second clad layer whose thickness is 0.1 mm and a first clad layer whose thickness is 0.12 mm. The thermoplastic resin molded body is produced through co-extrusion molding by adopting the same MMA-BA block copolymer as the first example for the material of the core layer while by adopting the same ETFE as the first clad layer according to the first example for the material of the second and first clad layers respectively. The light diffusing agent is added to the core layer such that the proportional ratio of the light diffusing agent by weight to the resin material from which the core layer is made is 0.5 ppm.

On the other hand, the light diffusing agent is not added to the second clad layer, but only to the first clad layer such that the proportional ratio of the light diffusing agent by weight to the resin material of the first clad layer is 1.3%. Blue and purple pigments which are bluing agents are added to the core layer such that the proportional ratio of the respective pigments by weight to the resin material from which the core layer is made is 1 ppm while an antioxidant is added to the core layer such that the proportional ratio of the antioxidant by weight to the resin material from which the core layer is made is 0.1%. The total light transmittance of those two layers of first and second clad layers turns out to be 18.2%.

Third Example

This example is the same as the second example except that the light diffusing agent is added to the core layer such that the proportional ratio of the light diffusing agent by weight to the resin material from which the core layer is made is 0.8 ppm.

Fourth Example

This example is the same as the second example except that the light diffusing agent is added to the core layer such that the proportional ratio of the light diffusing agent by weight to the resin material from which the core layer is made is 1 ppm.

Fifth Example

This example is the same as the second example except that the proportional ratio of the light diffusing agent by weight to the resin material from which the core layer is made is 3 ppm.

The production conditions of the comparison examples 1 to 3 as well as those of the first to fifth examples are summarized in the following table.

TABLE 2

| Measuring Device | Spectral Radiance Meter CS-2000 (manufactured by Konica Minolta, Inc.) | |
|---|---|---|
| Specification of Light Source | Driving Current 20 mA Directivity 30 degrees | Luminance 25 cd/m² |
| Sample Diameter [mm] | Ø6.3 | |
| Sample Length [mm] | 1000 | |
| Distance from Sample [mm] | 600 | |
| Measuring Range [mm] | 100 to 900 | |

Figure 4:
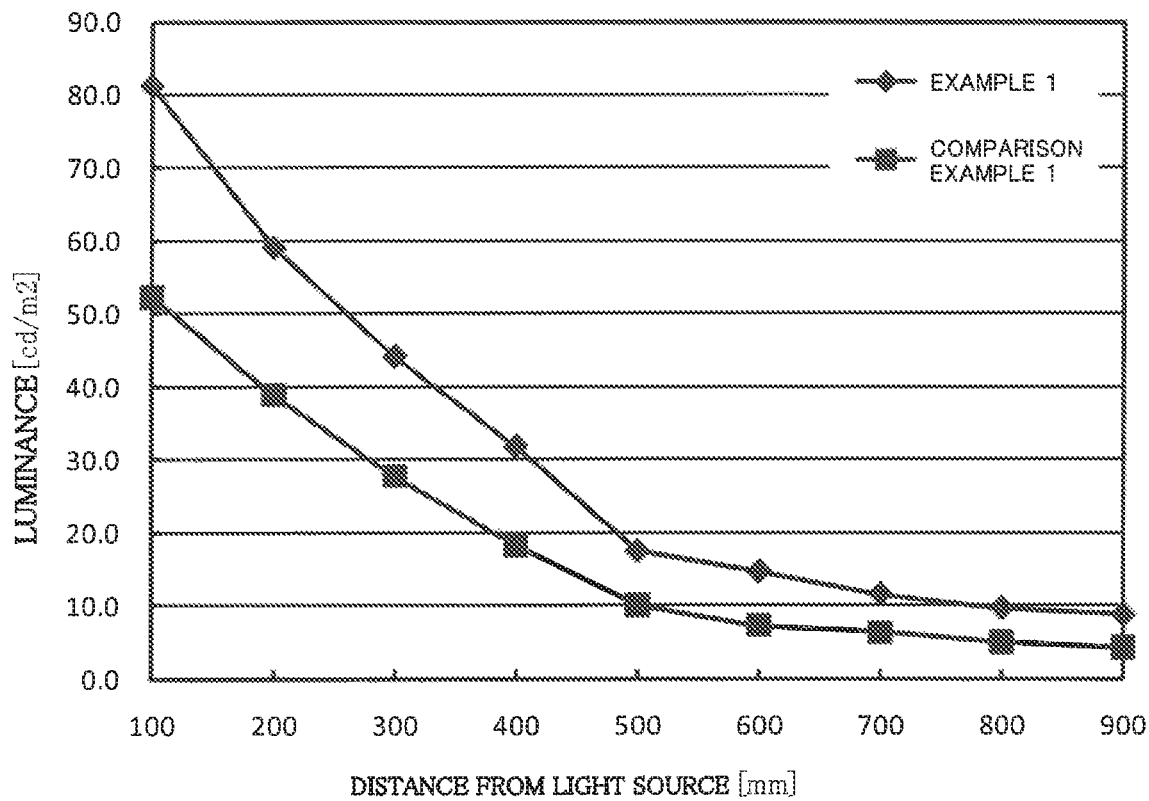
FIG. 4 is a graph showing the luminance test results of the thermoplastic resin molded bodies according to the present invention.
Figure 4:
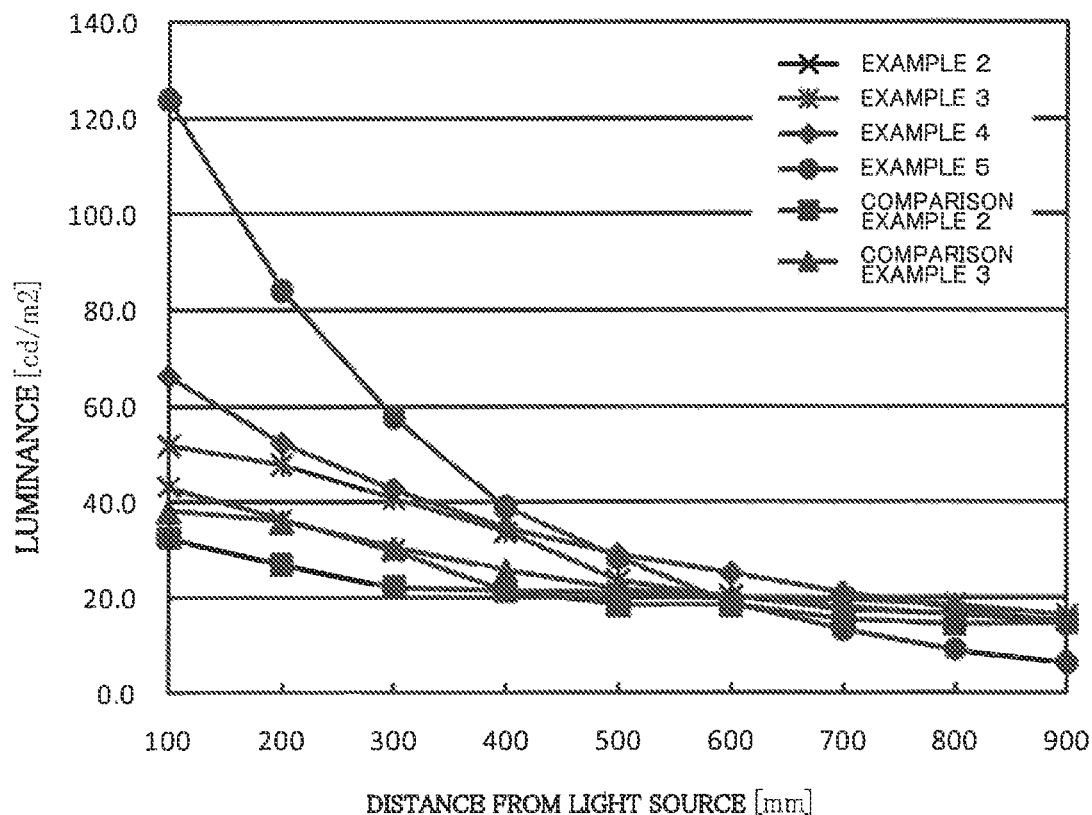

Then, as seen from FIG. 4 in which the measuring results are represented with graphs, in the case of the provision of one clad layer, it is confirmed that the overall luminance of the thermoplastic resin molded body according to the first example is larger than that of the counterpart according to the comparison example 1. Further, also in the case of the provision of two clad layers, it is confirmed that the luminance of each sample according to the second to fifth examples is larger than that of the counterparts according to the comparison examples 2 and 3. The detailed data on the luminance (unit of luminance: cd/m²) and attenuation rate of each sample are summarized in the following table.

TABLE 1

| | | First Example | Second Example | Third Example | Fourth Example | Fifth Example | Comp. Ex. 1 | Comp. Ex. 2 | Comp. Ex. 3 |
|---|---|---|---|---|---|---|---|---|---|
| | Material | | | | MMA-BA Block Copolymer | | | | |
| | Light Diffusing Agent | 1 ppm | 0.5 ppm | 0.8 ppm | 1 ppm | 3 ppm | N/A | N/A | N/A |
| Core Layer | Bluing Agent (Blue Pigment) | 1 ppm | 1 ppm | 1 ppm | 1 ppm | 1 ppm | N/A | N/A | 1 ppm |
| | Bluing Agent (Purple Pigment) | 1 ppm | 1 ppm | 1 ppm | 1 ppm | 1 ppm | N/A | N/A | 1 ppm |
| | Antioxidant | 0.1% | 0.1% | 0.1% | 0.1% | 0.1% | N/A | N/A | 0.1% |
| Second Clad layer | Material | N/A | ETFE | ETFE | ETFE | ETFE | N/A | ETFE | ETFE |
| | Thickness | N/A | 0.1 mm | 0.1 mm | 0.1 mm | 0.1 mm | N/A | 0.1 mm | 0.1 mm |
| First Clad Layer | Material | ETFE | ETFE | ETFE | ETFE | ETFE | ETFE | ETFE | ETFE |
| | Light Diffusing Agent | 0.065% | 1.3% | 1.3% | 1.3% | 1.3% | 0.065% | 1.3% | 1.3% |
| | Thickness | 0.24 mm | 0.12 mm | 0.12 mm | 0.12 mm | 0.12 mm | 0.24 mm | 0.11 mm | 0.11 mm |
| | Total Light Transmittance of Clad Layer (s) | 65.2% | 18.2% | 18.2% | 18.2% | 18.2% | 65.2% | 24.5% | 24.5% |

(Evaluation on Light Emitting Performance)

Then, as for each sample of the comparison examples 1 to 3 as well as the first to fifth examples, the luminance of each sample having 1000 mm in length and 6.3 mm in diameter is measured every 100 mm at the distances from the light source ranging from 100 to 900 mm. To note, the present evaluation is made in such a manner that a spectral radiance meter (manufactured by Konica Minolta, Inc. under the product name of CS-2000) is disposed at a location distant away by 600 mm in the vertical direction from a portion of each sample to be measured. The specification of the light source in use is as follows: driving current at 20 mA; 25 cd/m² in luminance; and directivity at 30 degrees. The measuring conditions are summarized in the following Table 2.

TABLE 3

| | Distance from Light Source [mm] | | | | |
|---|---|---|---|---|---|
| Sample | 100 | 200 | 300 | 400 | 500 |
| First Ex. | 81.3 | 59.1 | 44.2 | 31.8 | 17.5 |
| Second Ex. | 43.2 | 36.3 | 29.9 | 21.3 | 21.2 |
| Third Ex. | 51.8 | 47.8 | 40.8 | 33.7 | 23.7 |
| Fourth Ex. | 66.0 | 52.1 | 42.8 | 34.6 | 29.1 |
| Fifth Ex. | 124.1 | 84.0 | 57.6 | 39.1 | 28.2 |
| Comp. Ex. 1 | 52.3 | 38.9 | 27.8 | 18.3 | 10.1 |
| Comp. Ex. 2 | 32.5 | 26.9 | 22.1 | 21.2 | 18.4 |
| Comp. Ex. 3 | 38.1 | 35.9 | 30.5 | 25.8 | 21.6 |

| Distance from Light Source | Attenuation Rate [%/cm] |
|---|---|

TABLE 3-continued

| Sample | 600 | 700 | 800 | 900 | (100-900 mm) |
|---|---|---|---|---|---|
| First Ex. | 14.7 | 11.6 | 9.7 | 8.8 | 1.11 |
| Second Ex. | 20.2 | 17.3 | 16.7 | 15.1 | 0.81 |
| Third Ex. | 20.1 | 19.7 | 18.4 | 16.4 | 0.85 |
| Fourth Ex. | 25.1 | 20.9 | 17.6 | 14.8 | 0.97 |
| Fifth Ex. | 18.9 | 13.2 | 9.1 | 6.3 | 1.19 |
| Comp. Ex. 1 | 7.3 | 6.4 | 5.1 | 4.3 | 1.15 |
| Comp. Ex. 2 | 18.4 | 15.4 | 14.5 | 14.7 | 0.69 |
| Comp. Ex. 3 | 20.4 | 18.1 | 16.2 | 15.3 | 0.75 |

(Evaluation on Chromaticity Shift of Luminescent Color)

Figure 5:
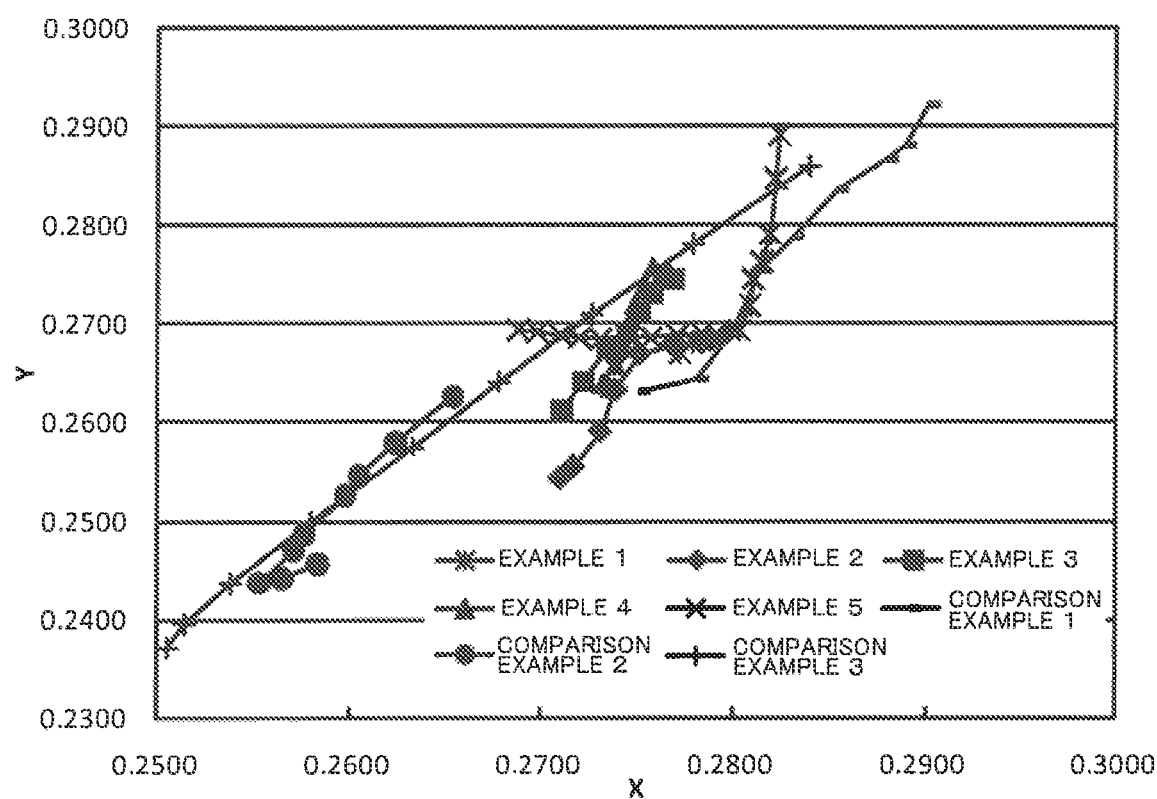
FIG. 5 is a graph showing the chromaticity shift results in luminescent color of the thermoplastic resin molded bodies according to the present invention and comparison examples.

As the result of checking chromaticity shift of luminescent color from the proximal side to the distal side with respect to the light source for each sample according to the comparison examples 1 to 3 as well as according to the first to fifth examples, as illustrated in FIG. 5, in the case of the provision of one clad layer, it is confirmed that yellowing of the luminescent color of the thermoplastic resin molded body according to the first example is further suppressed than that of the counterpart according to the comparison example 1. Also in the case of the provision of two clad layers, it is confirmed that yellowing of the luminescent color according to each sample of the second to fifth examples is further suppressed than that according to each sample of the comparison examples 2 and 3.

To note, the above evaluation on chromaticity shift of luminescent color is made for each sample such that the luminescent color at the distances from the light source ranging from 100 to 900 mm is measured every 100 mm employing a CIE chromaticity diagram with largeness in shift from the minimum x and y values (coordinates lopsided to bluing) to the maximum x and y values (coordinates lopsided to yellowing) compared. The detailed data on chromaticity shift for each sample are illustrated in the following table 4. As seen from Table 4, the x and y values proximal to the light source are minimum ones while those values distal from the light source are maximum ones excepting the sample according to the fifth example.

TABLE 4

| | | Distance from Light Source [mm] | | | | | | | | | Chromaticity Shift |
|---|---|---|---|---|---|---|---|---|---|---|---|
| Sample | Coordinate | 100 | 200 | 300 | 400 | 500 | 600 | 700 | 800 | 900 | (MAX-MIN) |
| First Example | x | 0.2772 | 0.2779 | 0.2803 | 0.2809 | 0.2810 | 0.2815 | 0.2819 | 0.2822 | 0.2824 | 0.0052 |
| | y | 0.2671 | 0.2681 | 0.2693 | 0.2719 | 0.2745 | 0.2763 | 0.2791 | 0.2847 | 0.2891 | 0.0220 |
| Second Example | x | 0.2710 | 0.2717 | 0.2731 | 0.2739 | 0.2751 | 0.2768 | 0.2784 | 0.2789 | 0.2797 | 0.0087 |
| | y | 0.2543 | 0.2555 | 0.2591 | 0.2633 | 0.2669 | 0.2678 | 0.2681 | 0.2683 | 0.2690 | 0.0147 |
| Third Example | x | 0.2711 | 0.2722 | 0.2735 | 0.2739 | 0.2745 | 0.2752 | 0.2758 | 0.2763 | 0.2769 | 0.0058 |
| | y | 0.2611 | 0.2641 | 0.2675 | 0.2675 | 0.2689 | 0.2711 | 0.2731 | 0.2749 | 0.2745 | 0.0138 |
| Fourth Example | x | 0.2736 | 0.2732 | 0.2739 | 0.2739 | 0.2742 | 0.2747 | 0.2748 | 0.2754 | 0.2758 | 0.0026 |
| | y | 0.2634 | 0.2639 | 0.2658 | 0.2669 | 0.2685 | 0.2705 | 0.2719 | 0.2740 | 0.2759 | 0.0125 |
| Fifth Example | x | 0.2784 | 0.2771 | 0.2757 | 0.2745 | 0.2731 | 0.2720 | 0.2710 | 0.2698 | 0.2688 | 0.0096 |
| | y | 0.2690 | 0.2688 | 0.2686 | 0.2686 | 0.2684 | 0.2686 | 0.2689 | 0.2691 | 0.2693 | 0.0009 |
| Comparison Example 1 | x | 0.2751 | 0.2781 | 0.2799 | 0.2814 | 0.2831 | 0.2854 | 0.2879 | 0.2889 | 0.2901 | 0.0150 |
| | y | 0.2631 | 0.2644 | 0.2690 | 0.2754 | 0.2789 | 0.2836 | 0.2867 | 0.2881 | 0.2922 | 0.0291 |
| Comparison Example 2 | x | 0.2583 | 0.2565 | 0.2553 | 0.2571 | 0.2576 | 0.2598 | 0.2605 | 0.2624 | 0.2653 | 0.0100 |
| | y | 0.2456 | 0.2442 | 0.2437 | 0.2470 | 0.2487 | 0.2525 | 0.2545 | 0.2579 | 0.2626 | 0.0189 |
| Comparison Example 3 | x | 0.2504 | 0.2514 | 0.2538 | 0.2580 | 0.2633 | 0.2678 | 0.2727 | 0.2779 | 0.2839 | 0.0335 |
| | y | 0.2372 | 0.2396 | 0.2437 | 0.2499 | 0.2575 | 0.2641 | 0.2710 | 0.2781 | 0.2860 | 0.0488 |

(Verification Test (ii) on Effect)

Explanation is given on the verification test (ii) on effects brought by the present invention as follows. In this verification test, a plurality of samples (according to the following comparison examples 4 and 5 and sixth example) whose materials for the core and clad layers and whose production methods are different from one another are produced and evaluation is made on each sample in terms of its light emitting performance (luminance of the emitted light) after it is subjected to ball impact test. To note, in this test, powdery titanium oxide is adopted for the light diffusing agent. The conditions under which each sample of the following comparison examples 4 and 5 and sixth example is produced are explained as follows.

Comparison Example 4

In this example, the circumferentially light-emitting type thermoplastic resin molded body is presented as a rod-shaped body which comprises a core layer and a first clad layer and whose outer diameter is 3.5 mm. For the materials of the core layer, polyoxypropylenetriol and polyoxypropylenediol are adopted for polymerpolyol while hexamethylene diisocyanate being adopted for a multifunctional compound having reactivity to the hydroxyl group. In turn, tetrafluoroethylene-hexafluoropropylene copolymer (FEP) is adopted for the material of the first clad layer. Then, the circumferentially light-emitting type thermoplastic resin molded body is produced with the mixture of the materials of the core layer filled in the tube comprising the first clad layer so as to be thermally cured.

Comparison Example 5

In this example, the circumferentially light-emitting type thermoplastic resin molded body is presented as a rod-shaped body which comprises a core layer and a first clad layer and whose outer diameter is 3.0 mm. What is bis (4-t-butylcyclohexyl) peroxydicarbonate acting as polymerization initiator is added to a polymerizable monomer (a mixed liquid composed of n-butyl methacrylate and triethylene glycol dimethacrylate, in which the proportional ratio by weight between them is 100 to 1) is adopted for the materials of the core layer. A tetrafluoroethylene-hexafluoropropylene copolymer is adopted for the material of the first clad layer. Then, a circumferentially light-emitting type thermoplastic resin molded body is produced with the materials of the core layer filled under pressure in the first clad layer molded into a tube shape with an extruder so as to be polymerized.

Sixth Example

In this example, a circumferentially light-emitting type thermoplastic resin molded body is presented as a rod-shaped body which comprises a core layer and a first clad layer and whose outer diameter is 3.5 mm. The circumferentially light-emitting type thermoplastic resin molded body is produced through co-extrusion molding with in use MMA-BA block copolymer whose MFR under the test conditions of the temperature of 190° C. and the load of 2.16 kg and whose flexural modulus of elasticity are 3.1 g/10 min and 400 MPa respectively is adopted for the material of the core layer while ETFE whose melting point, elongation rate, flexural modulus of elasticity and MFR under the test conditions of the temperature of 297° C. and the load of 5 kg are 192° C., 417%, 959 MPa and 78.6 g/10 min respectively being adopted for the material of the first clad layer.

(On Ball Impact Test)

Then, the above-mentioned ball impact test is methodically explained as follows. In this test, after each sample cut into 200 mm in length is left as it is for about three hours under the arbitrary temperatures (under the room temperature; under the temperature of −30° C.; under the temperature of 80° C.), impact is applied to the center portion of each sample with a steel ball (2.5 inches in diameter) having about 1040 g in mass dropped onto such center portion from the height of 306 mm. To note, the test is carried out with each sample placed on an iron plate whose thickness is about 30 mm.

(Evaluation on Light Emitting Performance)

Then, the method of evaluating the light emitting performance of each sample is explained as follows. The luminance of the emitted light of each sample subjected to the ball impact test is measured with respect to the center portion thereof before such ball is dropped thereon, at the very center portion where it has been dropped and with respect to the center portion thereof after it has been dropped thereon respectively. To note, the present evaluation test is made in such a manner that a spectral radiance meter (manufactured by Konica Minolta, Inc. under the product name of CS-2000) is disposed at a location distant away by 600 mm in the vertical direction from a portion of each sample to be measured. The specification of the light source in use is as follows: driving current at 20 mA; 25 cd/m$^2$ in luminance; and directivity at 30 degrees.

Figure 6:
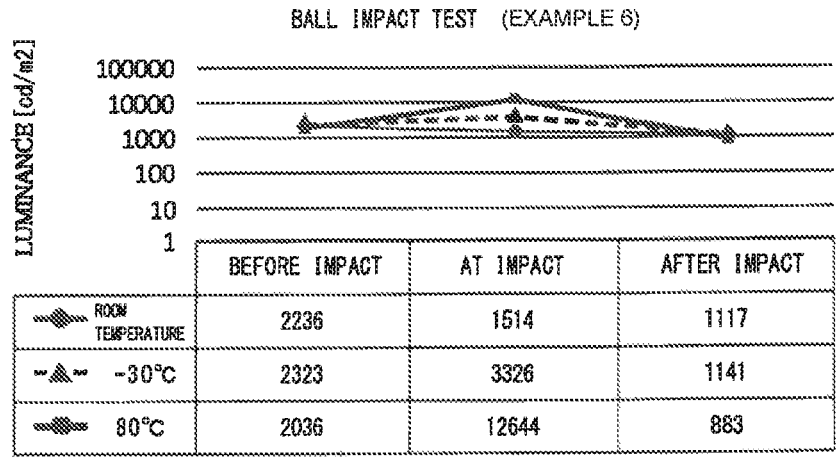
FIG. 6 illustrates graphs showing the test results on shock-proof property of the sampled thermoplastic resin molded body according to the present invention and according to comparison examples by each sample.
Figure 6:
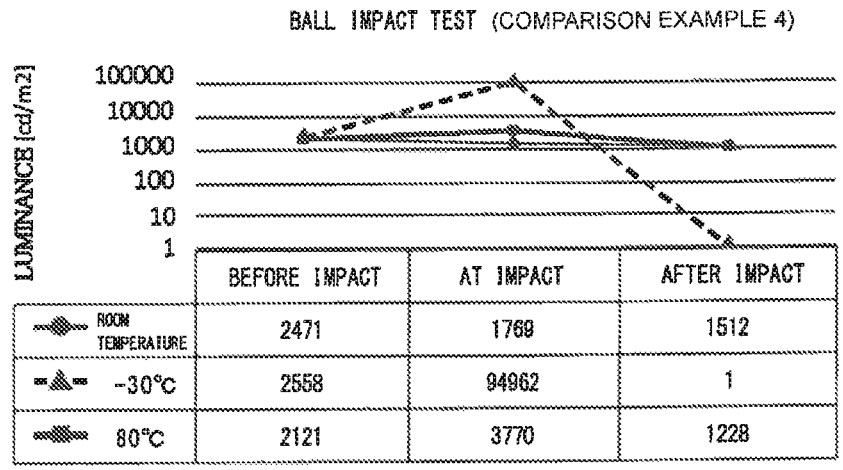
Figure 6:
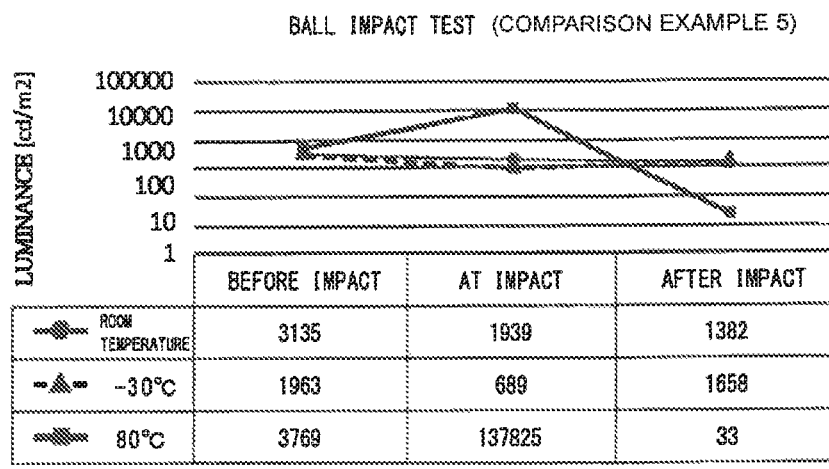
Figure 7:
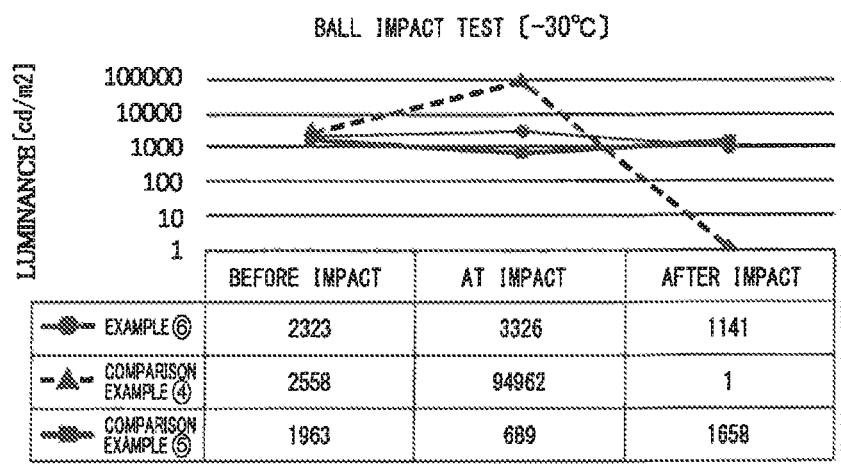
FIG. 7 illustrates graphs showing the test results on shock-proof property of the sampled thermoplastic resin molded body according to the present invention and those according to comparison examples under different temperature conditions.
Figure 7:
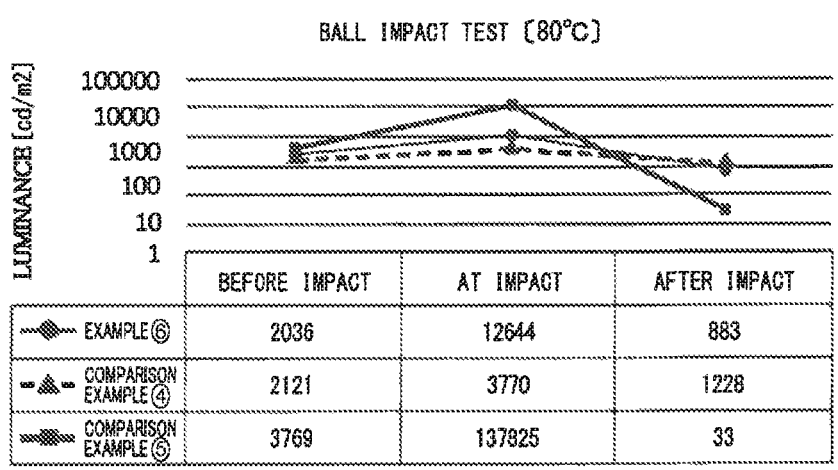

As the result of measuring the luminance of each sample at the ball impact and before/after the ball impact respectively, as illustrated in FIGS. 6 and 7, it is confirmed that the luminance of the emitted light of the sample according to the sixth example is significantly higher than that according to Comparison Example 4 in terms of the center portion thereof after such ball has been dropped thereon when reference is made to the result of each sample left under the temperature of −30° C. and subjected to the ball impact test. Also in the aspect of appearances, after each sample being subjected to the ball impact test under the temperature of −30° C., as to the sample according to the sixth example, there occurs just a dimple at the very point where such ball has been dropped whereas as to the sample according to Comparison Example 4, a whitened smudge due to its internal damage appears at the very point where such ball has been dropped.

On the other hand, as to each sample subjected to the ball impact test under the temperature of 80° C., it is confirmed that the luminance of the emitted light of the sample according to the sixth example is significantly higher than that of Comparison Example 5 with respect to the center portion thereof after such ball has been dropped thereon.

Also in the aspect of appearances, after each sample being subjected to the ball impact test under the temperature of 80° C., as to the sample according to the sixth example, there occurs just a dimple at the very point where such ball has been dropped whereas as to the sample according to Comparison Example 5, a whitened smudge due to its internal damage appears at the very point where such ball has been dropped.

As the result of the above verification test (ii), it is confirmed that the sample according to the sixth example, which is produced by co-extrusion molding with an acrylic based thermoplastic elastomer in use for the material of a core layer and a fluorine based resin in use for the material of a first clad layer, is more insusceptible to damage in appearances due to impact and is harder to invite the deterioration of the luminance of the emitted light than the samples according to Comparison Examples 4 and 5 which are produced according to the other materials and methods.

INDUSTRIAL APPLICABILITY

A circumferentially light-emitting type thermoplastic resin molded body according to the present invention is excellent in light emitting performance and shock-proof property besides the fact that it can be flexibly bent for use according to the type of optical ornaments or the shape of an object to be decorated and allows the overall luminance of the emitted light to improve in such a manner that it restrains the luminescent color from being yellowed at the distal locations of such body with regard to the light source, so that it is especially or preferably applicable to a light guiding rod.

Such light guiding rod is applicable to car interior illumination devices such as auxiliary lamps around an instrument panel, around a car audio and navigation system and those installed on a door panel, a console box and pillars. Besides, it is applicable to a courtesy lamp, a map lamp, a room lamp, a floor lamp, a foot lamp, a ceiling lamp and a door lamp.

Further, such light guiding rod is also applicable to car exterior illumination devices such as a headlamp, a tail lamp, a brake lamp, a side marker lamp and a number plate lamp. Moreover, it is also applicable to solar energy transmission systems, such optical signal transmission systems as on-board, cellular or FA equipment wiring and to such optical sensors as a liquid level sensor and a pressure-sensitive sensor as well as to image guide means such as endoscopes and light guide means for optical equipment.

Besides, such light guiding rod is also preferably applicable to luminaries and lamps for mobile phones, digital cameras, wrist-watches, vertical pinball machines ('pachinko' in Japanese), slot machines, automatic vending machines, collars for dogs, decoration items, traffic signs, washbasins, showers, temperature indicators of bathtubs, OA equipment, electric home appliances, optical equipment, various types of building materials, stairs, banisters, railway platforms, outdoor signs, barrier-free spaces as well as to backlights of liquid crystal displays, light guides for variable message boards and for IR and/or UV blocking illuminations exclusively dedicated for art and history museums. Further, such light guiding rod may be used as lighting devices for various types of illuminations and lighting facility with such rod combined with light sources.

LIST OF REFERENCE SIGNS

1 core layer
2 first clad layer 3 second clad layer
F thermoplastic resin molded body

The invention claimed is:

1. A circumferentially light-emitting type thermoplastic resin molded body comprising:
   a core layer comprising:
      a thermoplastic elastomer; and
      a light diffusing agent added to the thermoplastic elastomer;
   a first clad layer comprising:
      a thermoplastic resin whose refractive index is smaller than that of the thermoplastic elastomer;
      a light diffusing agent added to the thermoplastic resin; and
   a second clad layer disposed between the core layer and the first clad layer, the second clad layer comprising the same thermoplastic resin as that of the first clad layer and not comprising any light diffusing agent,
   wherein:
   a total light transmittance of the first clad layer is defined as less than 70%,
   a proportional ratio of a thickness of the second clad layer to that of the first clad layer ranges from 50% to 150%,
   a total thickness of the first and second clad layers ranges from 0.15 mm to 0.4 mm, and
   a proportional ratio by weight of the light diffusing agent added to the thermoplastic resin of the first clad layer ranges from 0.05 to 1.5%.

2. The circumferentially light-emitting type thermoplastic resin molded body according to claim 1, wherein a proportional ratio by weight of the light diffusing agent added to the thermoplastic elastomer of the core layer ranges from 0.5 ppm to 10 ppm.

3. The circumferentially light-emitting type thermoplastic resin molded body according to claim 1, wherein a proportional ratio by weight of a bluing agent added to the thermoplastic elastomer of the core layer ranges from 0.1 ppm to 10 ppm.

4. The circumferentially light-emitting type thermoplastic resin molded body according to claim 1, wherein a thickness of the first clad layer ranges from 0.1 to 0.3 mm.

5. The circumferentially light-emitting type thermoplastic resin molded body according to claim 1, wherein:
   the thermoplastic elastomer of the core layer comprises an acryl based thermoplastic elastomer, and
   the thermoplastic resin of the first clad layer comprises a fluorine based resin.

6. The circumferentially light-emitting type thermoplastic resin molded body according to claim 1, wherein the light diffusing agent added to the thermoplastic elastomer of the core layer and the light diffusing agent added to the thermoplastic resin of the first clad layer are each titanium oxide or barium sulfate.

* * * * *